(12) United States Patent
Rau

(10) Patent No.: US 8,099,253 B1
(45) Date of Patent: Jan. 17, 2012

(54) KEYBOARD TESTER

(75) Inventor: William Ronald Rau, Snohomish, WA (US)

(73) Assignee: Scout Analytics, Inc., Issaquah, WA (US)

( * ) Notice: Subject to any disclaimer, the term of this patent is extended or adjusted under 35 U.S.C. 154(b) by 385 days.

(21) Appl. No.: 12/477,803

(22) Filed: Jun. 3, 2009

(51) Int. Cl.
*G01L 25/00* (2006.01)
*G01P 3/00* (2006.01)
*G01C 9/22* (2006.01)
*B41J 5/00* (2006.01)

(52) U.S. Cl. ........ 702/113; 702/145; 73/865.3; 400/473

(58) Field of Classification Search .................... 702/145
See application file for complete search history.

(56) References Cited

U.S. PATENT DOCUMENTS

| | | | | |
|---|---|---|---|---|
| 2,192,594 | A * | 3/1940 | Samuel Brand et al. | 400/94 |
| 6,304,830 | B1 * | 10/2001 | Lee | 702/114 |
| 6,314,825 | B1 | 11/2001 | Fan | |
| 6,581,483 | B1 * | 6/2003 | Yeh | 73/865.3 |
| 6,648,531 | B1 | 11/2003 | Goldberg | |
| 2007/0198712 | A1 * | 8/2007 | Mani et al. | 709/225 |
| 2008/0303281 | A1 * | 12/2008 | Krueger | 290/44 |

* cited by examiner

*Primary Examiner* — Mohamed Charioui
*Assistant Examiner* — Manuel Rivera Vargas
(74) *Attorney, Agent, or Firm* — Blakely, Sokoloff, Taylor & Zafman, LLP

(57) ABSTRACT

Apparatus and methods are described for pressing and releasing keys and measuring timing data of the key presses and releases of a keyboard input device to determine characteristics of different types of keyboards. A key of the keyboard may be pressed and released by a machine at measured speed; and resulting keystroke timing data may be collected from to identify timing delays and differences in delays between when the key is pressed and when the resulting timing data is collected by a computer. The timing delays and differences in delays may be used generate more accurate biometric templates and authentication inputs when a type of keyboard is used.

17 Claims, 9 Drawing Sheets

| J | K | L | M | N | O | P | Q |
|---|---|---|---|---|---|---|---|
|  |  |  |  |  |  |  |  |
|  |  |  |  |  |  |  |  |
|  |  |  |  |  |  |  |  |
|  | 53.10 | 113.27 | 114.40 |  |  | 335.91 |  |
|  | 4.89 | 4.30 | 3.72 |  |  | 3.88 |  |
|  |  |  |  |  |  |  |  |
|  | 9.21% | 3.79% | 3.25% |  |  | 1.16% |  |
|  |  |  |  |  |  |  |  |
|  | 2nd key dwell | 1-2 up-down flight | 1-2 up-down flight |  |  | Total cycle |  |
|  | 55.88 | 109.92 | 111.93 |  |  |  |  |
|  | 64.10 | 112.10 | 113.26 |  |  | 345.50 |  |
|  | 55.94 | 121.11 | 112.06 |  |  | 334.76 |  |
|  | 63.98 | 112.27 | 112.03 |  |  | 343.95 |  |
|  | 56.03 | 112.03 | 111.97 |  |  | 335.98 |  |
|  | 55.07 | 112.07 | 112.85 |  |  | 336.02 |  |
|  | 56.01 | 112.26 | 112.03 |  |  | 336.07 |  |
|  | 63.90 | 104.13 | 111.99 |  |  | 335.93 |  |
|  | 55.91 | 112.08 | 112.11 |  |  | 336.12 |  |
|  | 55.93 | 112.11 | 112.06 |  |  | 336.00 |  |
|  | 55.97 | 112.05 | 112.24 |  |  | 336.19 |  |
|  | 63.87 | 112.09 | 112.22 |  |  | 343.91 |  |
|  | 55.86 | 112.08 | 112.12 |  |  | 335.93 |  |
|  | 63.96 | 103.95 | 113.22 |  |  | 337.08 |  |
|  | 63.69 | 104.19 | 112.31 |  |  | 334.99 |  |
|  | 55.85 | 104.13 | 112.19 |  |  | 328.00 |  |
|  | 55.92 | 111.98 | 120.16 |  |  | 343.94 |  |

KEYBOARD TESTER

FIELD OF THE INVENTION

The invention relates to keystroke dynamics authentication. More specifically, embodiments of the invention relate to an apparatus and method for detecting timing delays between when a key of a keyboard is pressed and when resulting keystroke data is collected by a computer coupled to the keyboard. The delays and differences in timing delays detected may be used to producing more accurate biometric templates and authentication inputs, for different types of keyboards.

BACKGROUND OF THE INVENTION

Authentication systems protect resources, such as documents and data, and accurately identify the creator of the resource. For example, a message (i.e., a written instrument or electronic document) created by an individual can be marked by a hand written signature, sealed by a physical seal, or protected by a password or a personal identification number (PIN) in order to identify the author of the message or control access to its contents. In some electronic or computer systems, the signature, PIN or password of the message creator is stored in a central memory or in storage media that is part of the computer system. When a user desires to read the protected message, the user enters the appropriate signature, password or PIN using an input device. The computer system compares the signature, password or PIN that is entered using the input device with the stored signature, password or PIN associated with the message to be accessed and determines whether to allow the message to be displayed or accessed.

Computer systems often contain valuable and/or sensitive information, control access to such information, or play an integral role in securing physical locations and assets. The security of information, assets and locations is only as good as the weakest link in the security chain, so it is important that computers reliably be able to distinguish authorized personnel from impostors. In the past, computer security has largely depended on secret passwords. Unfortunately, users often choose passwords that are easy to guess or that are simple enough to determine via exhaustive search or other means. When passwords of greater complexity are assigned, users may find them hard to remember, so may write them down, thus creating a new, different security vulnerability.

Various approaches have been tried to improve the security of computer systems. For example, in "have something, know something" schemes, a prospective user must know a password (or other secret code) and have (or prove possession of) a physical token such as a key or an identification card. Such schemes usually provide better authentication than passwords alone, but an authorized user can still permit an unauthorized user to use the system simply by giving the token and the secret code to the unauthorized user.

Other authentication systems rely on unique physical characteristics of users to identify authorized users. For example, fingerprints, voice patterns and retinal images have all been used with some success. However, these systems usually require special hardware to implement (e.g. fingerprint or retinal cameras; audio input facilities). Therefore, there is a need for an authentication method that uses unique physical characteristics of users without requiring special hardware.

One solution involves basing user authentication on measurements of users' keystroke timings using, for example, timing collection software that is installed on the computer system. However, any solution that relies on keyboard timings is subject to errors or inconsistencies that may be introduced by timing changes or variables anywhere between a user's fingers pressing the key and collection of the timing data by a computer and/or timing collection software.

SUMMARY OF THE DESCRIPTION

Apparatus and methods are described for detecting and measuring timing calculations of key presses between respective keys of a keyboard input device to determine characteristics of the keyboard input device. A machine may be used to press and release keys, and to measuring timing data of the key presses and releases of a keyboard input device to determine characteristics of different types of keyboards. A key of the keyboard may be pressed and released by a machine at measured speed; and resulting keystroke timing data may be collected from to identify timing delays and differences in delays between when the key is pressed and when the resulting timing data is collected by a computer. The timing delays and differences in delays may be used generate more accurate biometric templates and authentication inputs when a type of keyboard is used.

BRIEF DESCRIPTION OF THE DRAWINGS

The present invention is illustrated by way of example and not limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
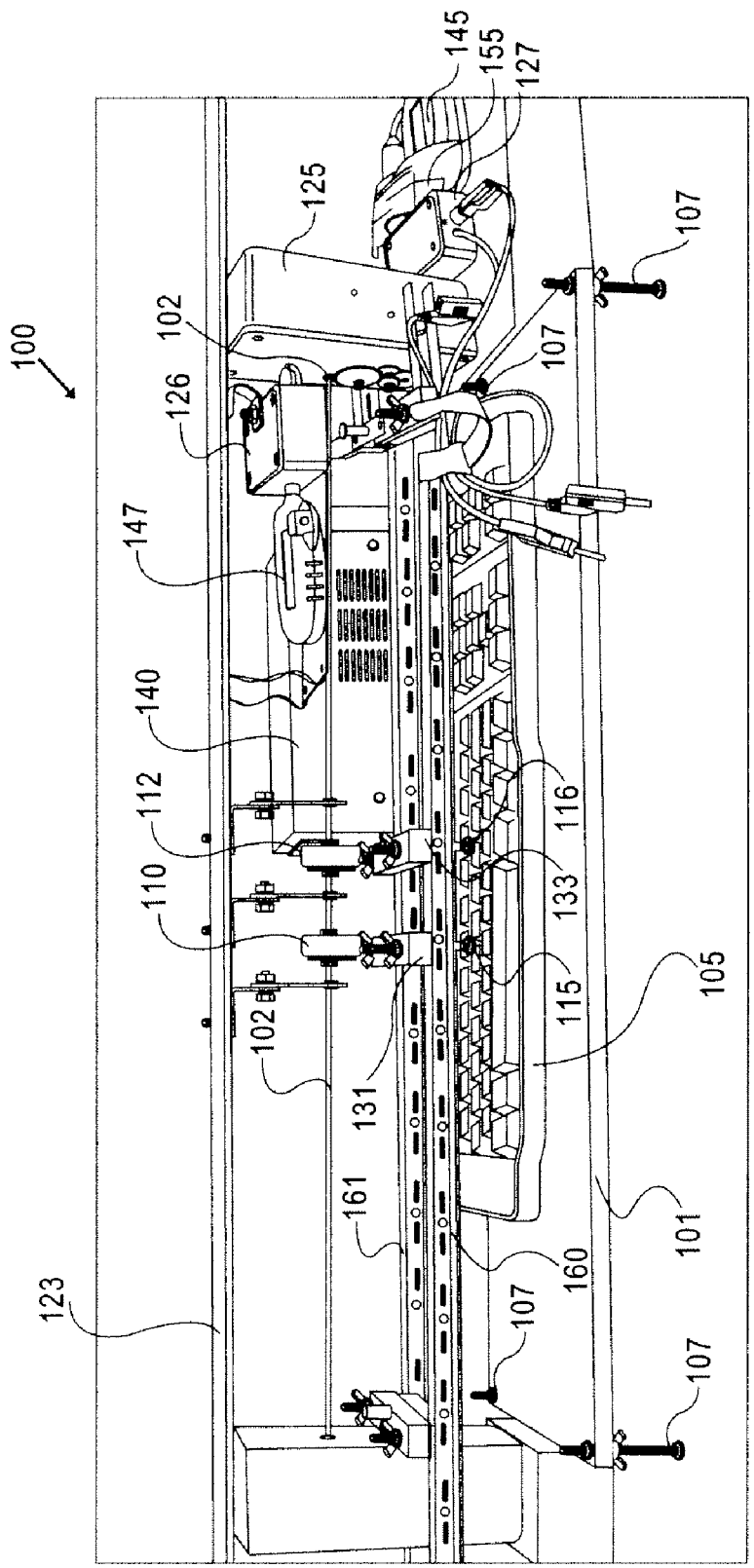
FIG. 1 is diagram illustrating one embodiment of an apparatus for entering keystrokes at predetermined known intervals.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. It will be apparent to one of ordinary skill in the art that the embodiments may be practiced without some of these specific details. In other instances, certain structures and devices are omitted or simplified to avoid obscuring the details of the various embodiments.

An authentication method may authorize users based on the user input patterns. For example, the user input pattern may include the speed in which the user inputs the passwords. This method does not require complicated physical characteristic recognition systems, provides a cost effective and strong secure authentication method, and does not entirely rely on the content of the password or secured information.

A method to implement this authentication method based on user input patterns is to collect user input samples. To authenticate a user based on the physical/behavior characteristic, user samples needed to be categorized. A measurement of such physical/behavior characteristics may be referred to as the biometric measurements. For example, when a user enters a password, the time duration between keystrokes as the user types the password can be construed as a biometric measurement. Another example will be handwriting sampling wherein the size, the speed, or the time duration between letters may be measured and construed as a biometric measurement. Yet another example will be the measurement of the user's height, weight, hair color, blood samples, etc. For the purpose of this application, biometric measurements and raw samples (e.g. raw data sample, input data, etc.) will be used interchangeably.

Biometric measurements that rely on a user's physical/behavior characteristics may be combined with the secrecy of a passcode to increase the ability to distinguish between authorized users and impostors. When a user is authenticated via a biometric security system, the user's physical/behavior characteristic is measured (e.g., an authentication input) and compared with a predetermined template. If there is match, the user is authenticated. In the process of determining a template, the user may be required to enter multiple samples. By processing through an engine these multiple samples will be transformed into a biometric template.

Variations may occur when a user enters multiple samples. For example, the timing when the user enters a first password may differ from the timing when the user enters a second password. Therefore, it is important to categorize these variations of samples and eliminate outliers. In eliminating outliers, a category of samples which best represents the physical/behavior characteristics of the user may be found. The category that best represents the physical/behavior characteristics may be used to create a biometric template for future authentication purpose.

However, basing a template and/or authentication input on keyboard timing measurements of users' keystrokes is subject to differences or inconsistencies that may be introduced by timing changes or variables anywhere between a user's fingers pressing the keys, and collection of the timing data by timing collection software of a computer coupled to the keyboard. Such variables include characteristics of the keyboard device used, such as delays (and differences in delays) in periods of time between when a key is pressed (and/or released) and when a timing signal or data generated by the keyboard is detected or collected by timing collection software installed on the computer system.

There are a multitude of different key input devices and very little information about how these key input devices differ, especially with respect to keystroke timings. Therefore, studying systems via key input devices may determine valuable insight into how different components impact the quality and accuracy of user biometric authentication, such as based on timing inconsistencies. In particular, there are many components that play a role. For example, Universal Serial Bus (USB), battery strength, laptop docking stations, etc., may play a role in the inconsistent measurements of keystroke timings.

One way to study these errors is with a physical device (e.g., a specialized machine, such as including mechanical and electronic components) that can repeatedly press and release keys of a keyboard at accurate or known times, and collect resulting keystroke timing signals or data using software running on a computer that the keyboard is connected or coupled to. Using such as device it is possible to identify or calculate delays in time (e.g., periods of time) between when a key of a type of keyboard (e.g., based on a particular manufacturer, model, and/or serial number series; whether the keyboard is wired, wireless, BLUETOOTH; and/or whether the keyboard input to the computer includes a serial or USB connection) is pressed (and/or released) and when resulting keystroke signal or data is received or collected by software of a type of computer (e.g., based on a particular manufacturer, model, and/or serial number series) coupled to the keyboard. However, such a physical device requires careful construction given the unique problems that are presented.

Apparatus for Entering Keystrokes at Known Intervals

FIG. 1 is an embodiment of a view of an apparatus 100 for entering keystrokes at predetermined known intervals. The apparatus measures characteristics of an input device (i.e., a keyboard) to identify the interval between consecutive keystrokes. Base 101 supports keyboard 105. Adjustable leg 107 is coupled to base 101 and provides an adjustment of the height of base 101. Cams 110 and 112 are coupled axle 102 and rotated by gear tower 125. During rotation, the cams 110 and 112 come in contact with shafts 115 and 116 and drive them into respective keys on keyboard 105 to depress the keys and then to release the keys. The cams have an oval or elliptical cross sectional shape with respect to an axis of axle 102. The axle may be rotationally attached or fixed to the cams at or near (1) the middle of the cross sectional cam shape; or (2) closer to the smaller end than the middle of the cross sectional cam shape. Thus, as the cams are rotated by the axle, the thickness of the cam cross section increases and decreases between the axle and shaft, with each rotation. Shafts 115 and 116 are fitted into apertures formed in crossbeams 131 and 133. Support beams 117 provide lateral support to the crossbeams. Support beam 123 provides vertical and lateral support to axle 102.

In one embodiment, power supply 140 provides regulated power to power electric motors that rotate the axle. An electric motor may be placed within light box 127. Regulated power allows the electric motor to rotate at a consistent speed. Fluctuations in the power that are common in conventional supplied power in domestic environment (e.g., unregulated electricity from a utility company) make it unsuitable for the apparatus.

Gear tower 125 includes an array of gears that gear down the rotation of the electric motor. This is helpful because, typically, the electric motor inside light box 127 rotates at a higher RPM, as compared to a rotation of axle 102. The higher motor RPM is desired to simulate the speed of human typing, a speed slow enough not to damage the cams and shafts, and/or a speed slow enough to allow the device to capture timing data. Also, to simulate the speed of human typing, the rotation of axle 102 may be selected (e.g., by selecting array of gears) to be much slower than that of the motor. Moreover, the higher RPMs of the driving motor are desirable to increase or provide a sufficient measure of accuracy of known key press (and/or release) timings, and periods between presses (and/or releases) using the mechanism. Using the device it is possible to be able to physically measure a high revolutions per second at the motor, and translate this to a key press interval that approximates human typing.

Light meters 145 and 147 read RPM readings from the electric motor and axle 102, respectively. The light meters may be coupled directly or attached to light box 126 (as in the case of light meter 147) and to light shield 155 (as in the case of light box 127). In one embodiment, each light meter has a minimum resolution of 30-50 ms, with an ideal being below 10 ms. For example, an RPM reading from light meter 145 measures the rotation of the electric motor. Typically, this is a high RPM that does not simulate the speed of human typing. However, after being geared down by the array of gears of gear tower 125, the RPM reading of light meter 147 that measures the rotation of axle 102 is closely approximated to the speed of human typing.

Figure 2:
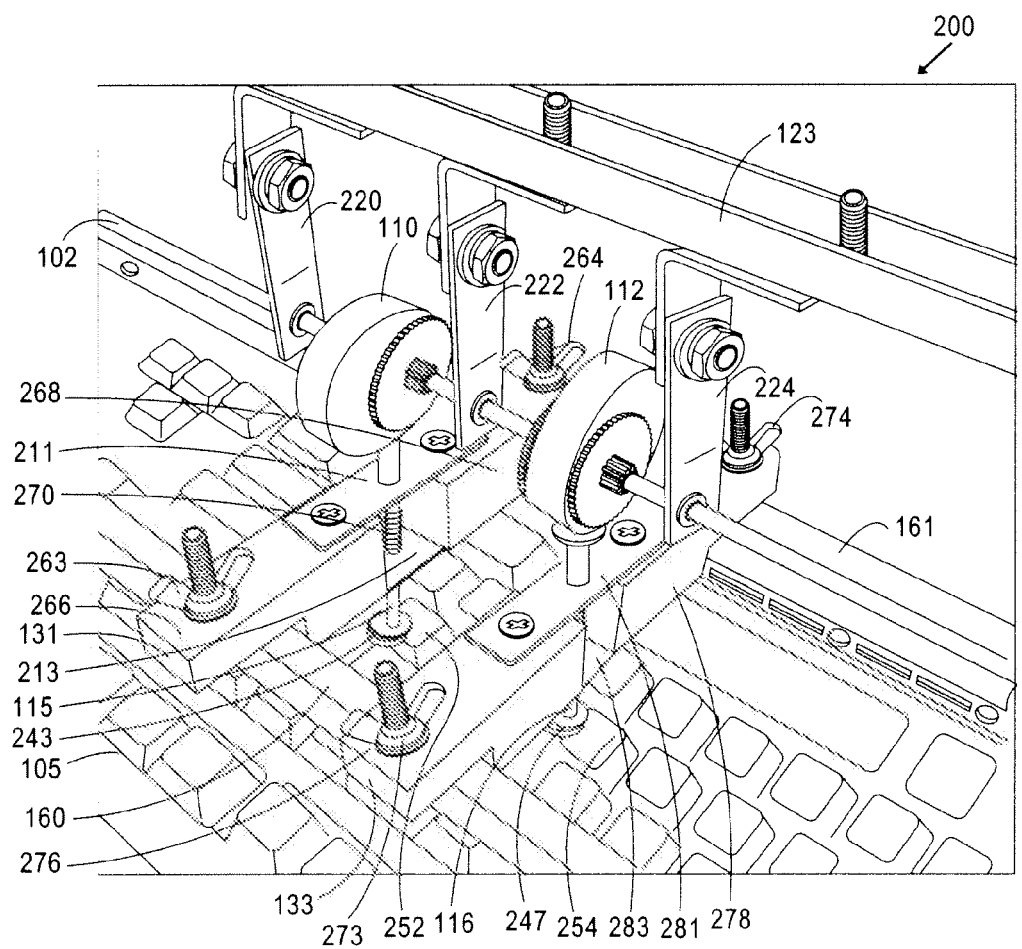
FIG. 2 is a diagram illustrating one embodiment of the support structure of an apparatus for entering keystrokes at predetermined known intervals.

FIG. 2 is an embodiment of a close-up view of cams and related support structure 200 of apparatus 100 for entering keystrokes at predetermined known intervals. Cams 110 and 112 are rotated by axle 102 to be touching or push on drive shaft 115 and 116 to depress (and/or release) first key 252 and second key 254, respectively. In one embodiment, the cams are out of phase so that as axle 102 rotates, cam 110 depresses first key 252 of keyboard 105 while cam 112 is releases second key 254 of keyboard 105. Further, cams 110 and 112 may be lubricated using, for example, a graphite-based compound (e.g., powder) to reduce friction between the tops or upper surfaces of shafts 115 and 116, and the surfaces of the cams, as the cams strike or push on the respective shafts while rotating. In an alternate embodiment, solenoids may be used instead of cams for depressing the shafts.

In some embodiments of the apparatus, more than two keys may be depressed by cams 110 and 112. For example, each cam may be attached to an end of a pivoting axle (e.g., similar to a see-saw), such that each cam drives two key presses. In this manner, four key presses with only two cams on the drive axle could be achieved, all out of phase with each other. A stronger motor could drive three or four cams for six or eight keys.

Pads 243 and 247 are respectively coupled to shafts 115 and 116, such as on the bottom of each shaft, where each shaft will contact a key (e.g., between the end of the shaft and the key the shaft will press). In one embodiment, cloth material such as felt may used as or included in pads 243 and 247 to approximate the 'fleshiness' of humanoid fingers, such as by adding an elastic thickness that simulates the delay in pushing and releasing a key, similar to that of human flesh between a finger bone and outer skin surface. Support linkages 220, 222 and 224 are coupled to beam 123 to provide a barrier between cams 110 and 112. Cross beam 131 may include supports 266 and 268 bridged together using upper plate 211 and lower plate 213, such as by being screwed there-between. Butterfly nuts 263 and 264 further secure supports 266 and 268 to support beams 160 and 161. Similarly, cross beam 133 may include supports 276 and 278 bridged together using upper plate 281 and lower plate 283, such as by being screwed there-between. Butterfly nuts 273 and 274 further secure supports 276 and 278 to support beams 160 and 161.

In one embodiment, spring 270 is disposed around shaft 115 between upper plate 211 and lower plate 213. In this manner, as cam 110 is rotated by axle 102, upon cam 110 striking or pushing down on shaft 115, spring 270 provides resistance to the downward force of cam 110. For instance, spring 270 provides and upward force to push the shaft back up to be touching or be biased against the cam when the thickness of the cam cross section decreases between the axle and shaft. Shaft 116 may have a similar spring. Further, in some embodiments, axle 102 is positioned equidistant from the respective keys of keyboard 105.

Figure 3:
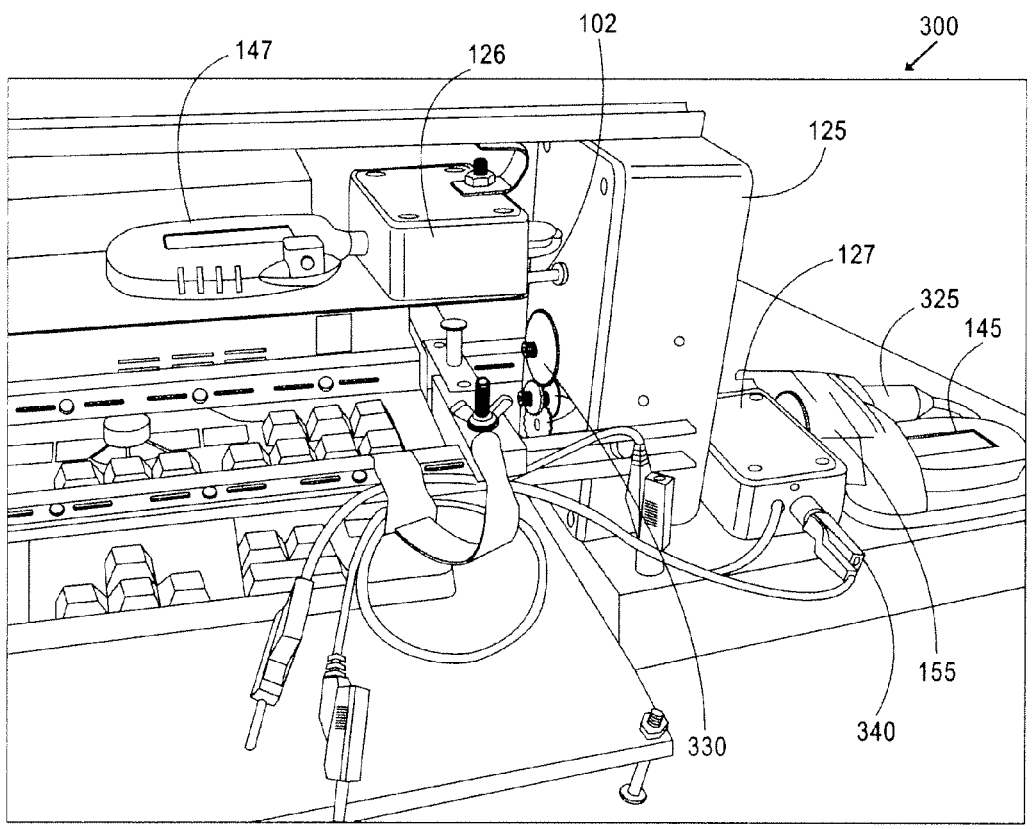
FIG. 3 is a diagram illustrating one embodiment of light meters of an apparatus for entering keystrokes at predetermined known intervals.

FIG. 3 is an embodiment of a view of light meters 300 of apparatus 100 for entering keystrokes at predetermined known intervals. Light meters 147 and 145 are photosensitive and measure RPM readings from light boxes 126 and 127, respectively. In light box 126, a propeller may be mounted to axle 102 that functions as a drive shaft to rotate this propeller. In one embodiment, a light source such as a LED flashlight is positioned behind the propeller to index the blades of the propeller for meter 147. In light box 127, a motor drive shaft may attached to the electric motor mounted to a propeller inside light box 127 to rotate this propeller. In one embodiment, a light source such as a LED flashlight 325 is positioned behind this propeller to index the blades of the propeller for meter 145. The LED flashlights may include a flexible neck that is attached to the light boxes to accurately position the flashlights behind the propellers. Light meters 147 and 145 then measure RPM readings as the propellers are rotated by the axel and motor, respectively (which are linked by gears) based on the light from the LED flashlights positioned behind the propellers. Light shield 155 prevents light leakage from light box 127.

Gear tower 125 includes an array of interlocking gears 330 (e.g., and including gears 450 of FIG. 4) that may be selected or predetermined to gear down the electric motor in light box 127 to a slower rate of rotation for axle 102. Gears 330 may be selected or predetermined to cause axle 102 to rotate at a selected or predetermined lower speed than the electric motor inside of light box 127, which is a speed that causes the cams to push down the shafts at a speed that simulates the speed of human typing. For example, each shaft may press a key at a repeat rate similar to a typing rate for typing keys using one hand during average typing speeds. Further, power leads 340 may be connected to a regulated power supply to provide power to the electric motor.

Figure 4:
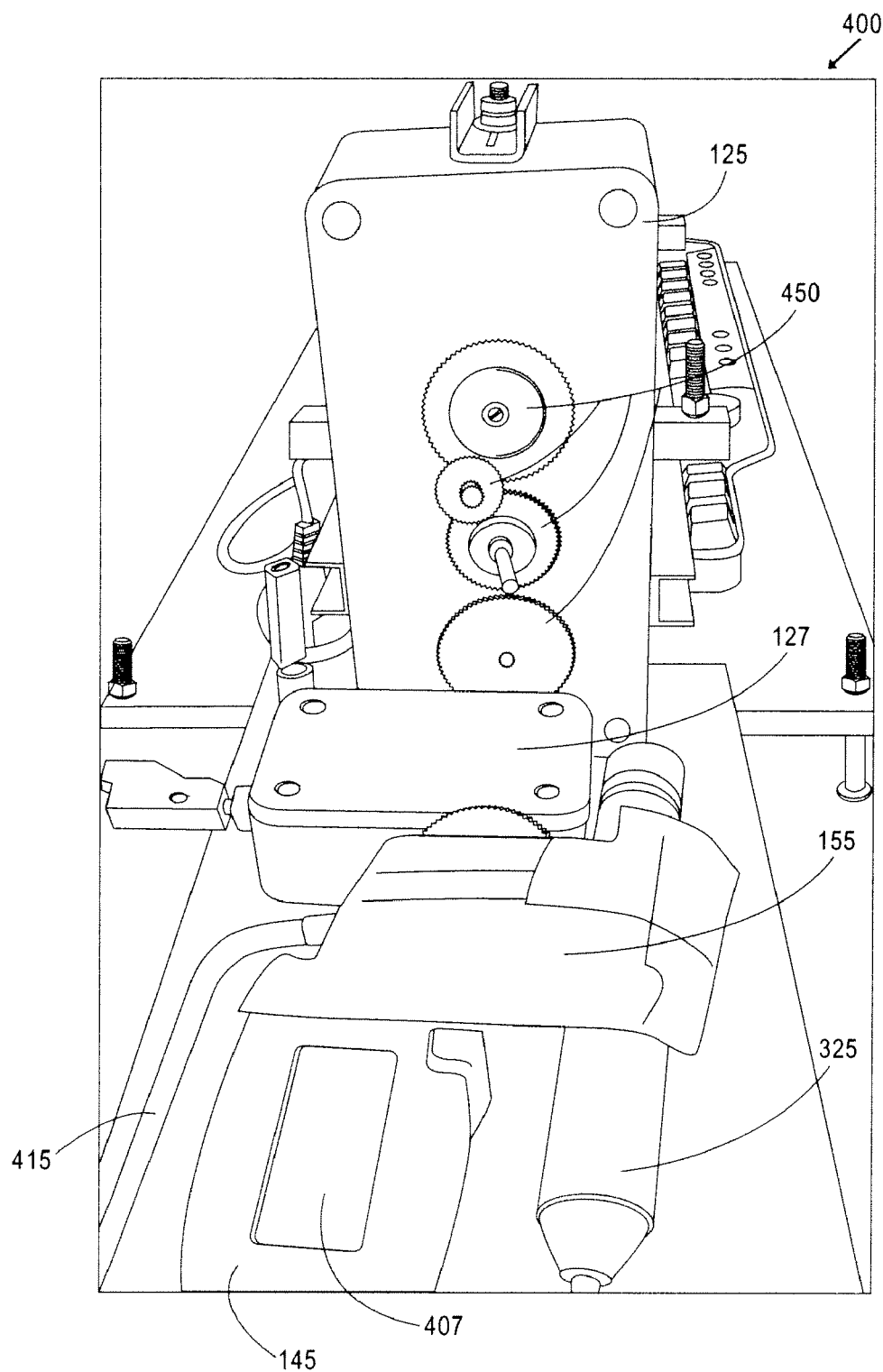
FIG. 4 is a diagram illustrating one embodiment of a gear array of an apparatus for entering keystrokes at predetermined known intervals.

FIG. 4 is an embodiment of a view of a gear array 400 of apparatus 100 for entering keystrokes at predetermined known intervals. Light meter 145 includes display 407 to show RPM measurements from light box 127. To accomplish this task, LED flashlight 325 includes neck 415 that is attached to light shield 155. Light coming out of neck 415 from a light source from LED flashlight 325 is then positioned behind a propeller in light box 127. The propeller is attached to a motor drive shaft of an electric motor inside of light box 127. Light meter 145 is photosensitive and then may measure RPM measurements based on the light from LED flashlight 325 as the propeller is being rotated. In one embodiment, light shield 155 prevents the leakage of light from LED flashlight 325.

To simulate the speed of human typing, gear array 450 (e.g., including gears 330) of gear tower 125 includes a configuration of interlocking gears that gear down the RPM of the electric motor inside of light box 127. For example, the motor inside of light box 127 may spin at a higher RPM that what is desired for axle 102. The configuration of interlocking gears (e.g., gears 450 and 330) slows the rotation of axle 102 as compared to the motor inside of light box 127 so that the axle (e.g., axle 102 as described above) can rotate at a speed that allows the shafts to approximate human typing. In this manner, the cams strike the keys on the keyboard device at a speed similar to a human.

Collection of Biometric Data

Figure 5:
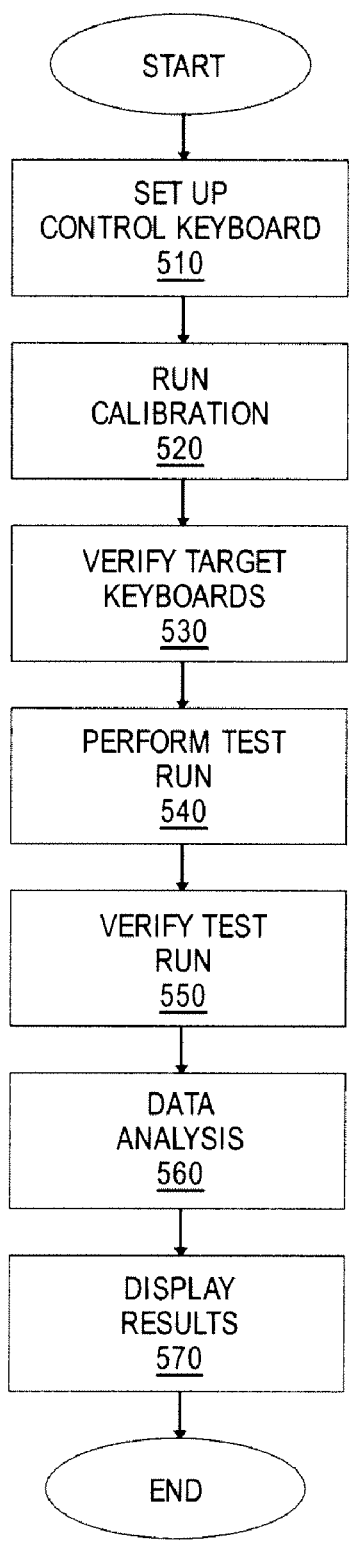
FIG. 5 is a diagram illustrating a process of testing keyboards.

FIG. 5 is an illustration of an embodiment for a process of the collection of keystroke timing data using embodiments of the above described apparatus, such as those of FIGS. 1-4. At block 510, a control keyboard is set up. In one embodiment, the apparatus is configured by selecting the motor and axle RPM, voltages, run duration, number of cycles and initial keyboard position using a control keyboard. Measurements may be taken, including testbed (e.g., base 101) height from a table the device is on, distance from a bottom of a first cam (e.g., when the thickness of the cam cross section is at a maximum between the axle and shaft) to bottom of one depressed key (e.g., when the key is fully pressed an stops at it's bottom stop), and distance from axle 102 to the top of each key (which may be selected to be equidistance for each key). In some cases, instead of one depressed key and each top key measurement, measurements may be taken to confirm that the distance from a bottom of each first cam to a bottom of each depressed key is the same.

In block 520, a calibration run is performed using the control keyboard. In block 530, target keyboards are selected for testing. Block 530 may include verifying that the target keyboards fit within the adjustable table height range. For each keyboard, the keyboard is positioned so that the target key tops are equidistant from the axle. Next, the first key height is set to the same distance from the cam as was measured for the control keyboard (e.g., a distance from a bottom of a first cam to a bottom of the first depressed key). Also, after any height check, it can be confirmed that the target key tops are equidistant from the axle. Alternatively, as noted above, each key height can be checked. In some cases, the distance measured from the bottom of the cams to the keys when depressed is equal so that the cams travel the same distance from fully up to the bottom of each key. Here, may vary is the placement of the top of a key for any given keyboard when not depressed. The same key is then verified as the first to be depressed. At block 540, a test run is performed to the same number of cycles.

At block 550, the test run is verified. The run duration is compared to that of the control keyboard. The keys pressed are verified as being the same letters in the same order as the control keyboard. Finally, verification is performed so that there are no trailing zeros at the end of the run.

At block 560, data analysis is performed. In one embodiment, one simple, useful type of timing datum that can be computed from the raw keystroke timing data (e.g., detected key press and release timing data collected) is the length of time a key is depressed, the "dwell time." Another useful measure is the time from the release of one key to the depression of the next, called the "flight time." Dwell and flight times can efficiently represent all of the key events that occur during the typing of a phrase. Note that flight time may be negative. See FIG. 6 for more explanation of these types of timing.

Other derived measures could also be used by an embodiment. For example, the key-press-to-subsequent-key-press time, or key-release-to-subsequent-key-release time also permit the events that occurred during the typing of the phrase to be represented in a useful way. Some embodiments may compute key press and release times relative to the key press event that starts the entry of the phrase, or the key press (or release) event that ends entry of the phrase.

Specifically, data collecting may include collecting (e.g., recording and/or storing) of the measured or known times of key presses (and/or releases) by measuring the rotation of the motor and/or axle 102 using meters 145 and/or 147 respectively; and the resulting keystroke timing data using a computer coupled to the keyboard (e.g., software being executed on the computer).

Data analysis may include calculating (e.g., including recording and/or storing) timing delays, and differences in delays between when the key is pressed (and/or released) and when the resulting timing data is collected (e.g., using software being executed on a computer coupled to the keyboard to analyzed or calculated this data).

At block 570 the collected and analyzed data, or results thereof, can be output such as to a display, printer, or data storage medium (e.g., storage memory such as a hard drive, flash memory, USB memory device, CD, DVD, magnetic and or optical disk). This data can be subsequently used to generate calibration data for a type of keyboard used for producing biometric templates and authentication. Specifically, the timing delays and differences in delays may be used to generate data used for producing more accurate biometric templates and authentication inputs, such as using the type of keyboard measured (and optionally including the type of computer used to measure the keyboard), such as further noted below.

Figure 6:
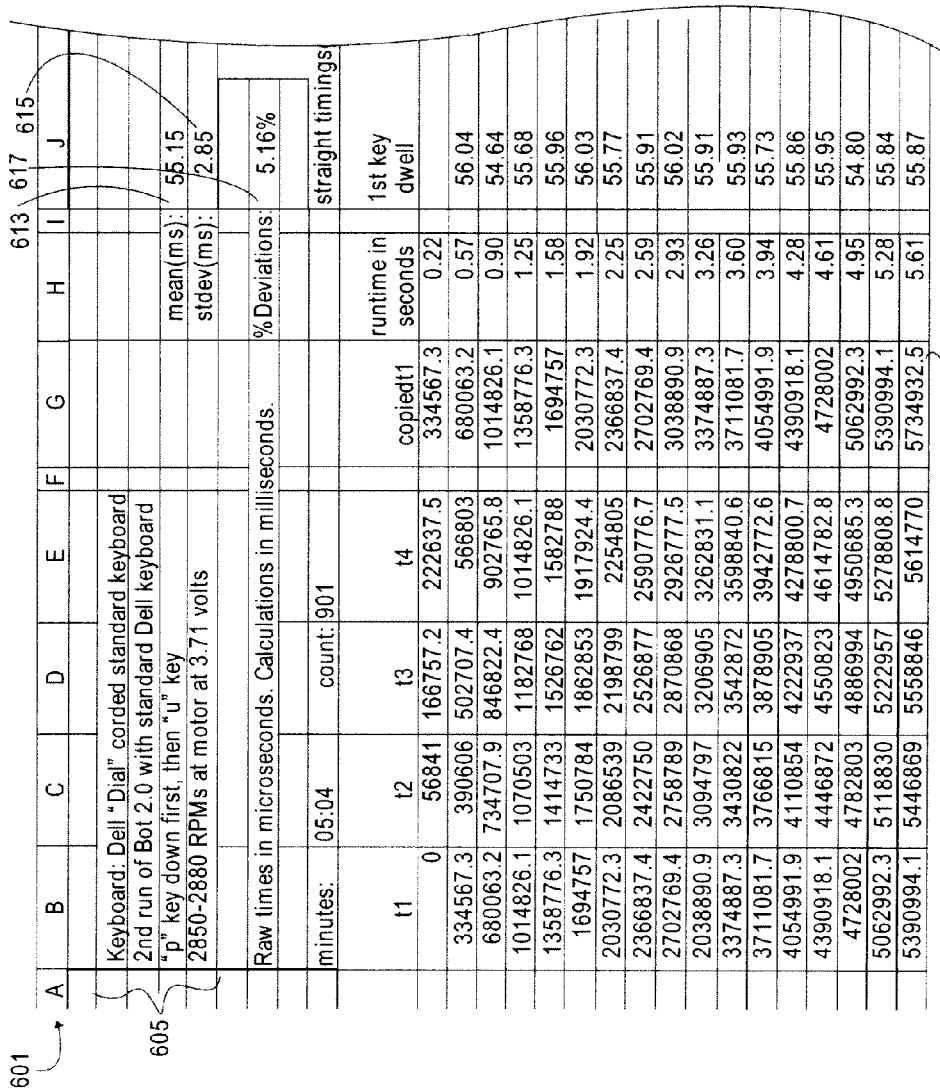
FIG. 6 is a diagram illustrating data analysis derived from the measured timings of a keyboard.

FIG. 6 is a diagram illustrating data analysis derived from the measured timings of a keyboard. Timing data collected from the keyboard may be included in spreadsheet 601. In one embodiment, configuration data 605 includes information related to the type of keyboards (e.g., particular manufacturer, and model; whether the keyboard is wired, wireless, BLUETOOTH, USB, . . . ), the order of the particular keys that were selected for testing, and the configuration of the electric motor including RPMs and power setting.

Time measurements for different types of timing may be collected, including the first key dwell time 610, second key dwell time 620, first key to second key up-down flight time 630 and second key to first key up-down flight time 640 are included in respective columns. Total cycle time 650 is a sum of the first key dwell time 610, second key dwell time 620, first key to second key up-down flight time 630 and second key to first key up-down flight time 640. In one embodiment, time measurements are calculated in milliseconds. Time measurements may be calculated with a resolution in a sub 20 millisecond range.

Moreover, an average mean, standard deviation and percent deviation may be calculated for each respective keyboard type of timing measurement. For example, average mean 613, standard deviation 615 and percent deviation 617 are calculated for the type of timing measurements of the first key dwell time 610. Timing data and these calculations may be performed for each type of timing for one, two, four, or more keys of a keyboard (e.g., type of keyboard).

Figure 7A:
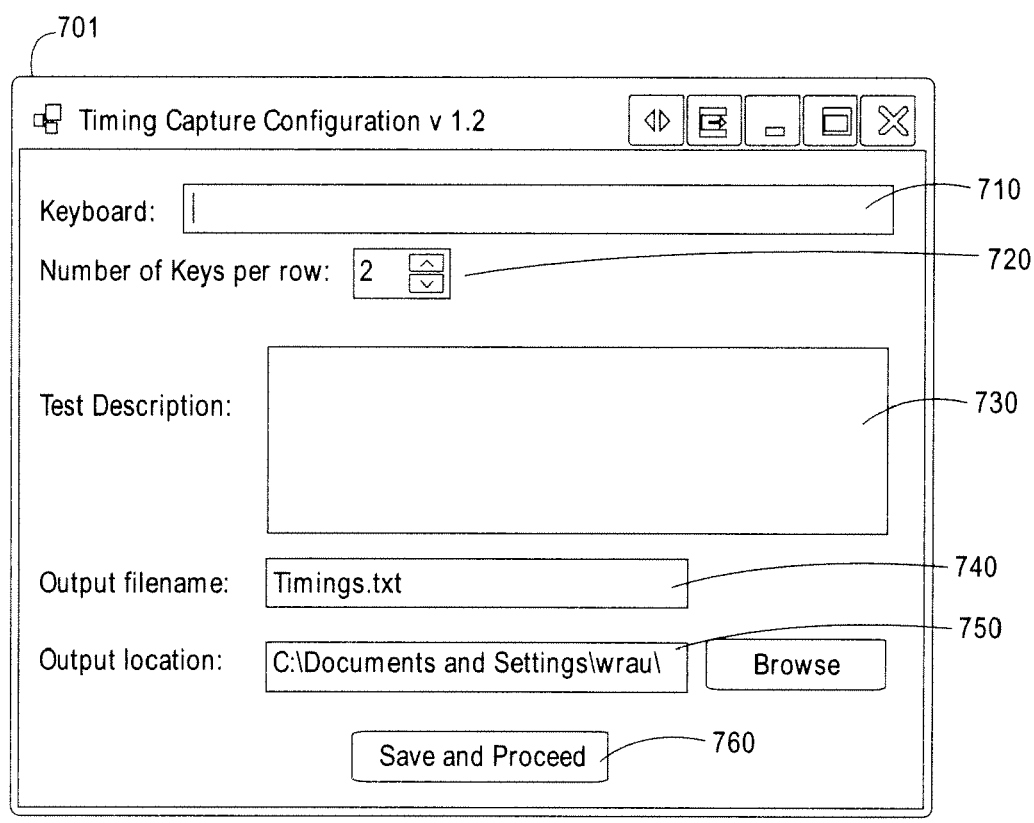
FIG. 7A is a diagram illustrating a graphical user interface of a component for measuring timings from a keyboard.
Figure 7B:
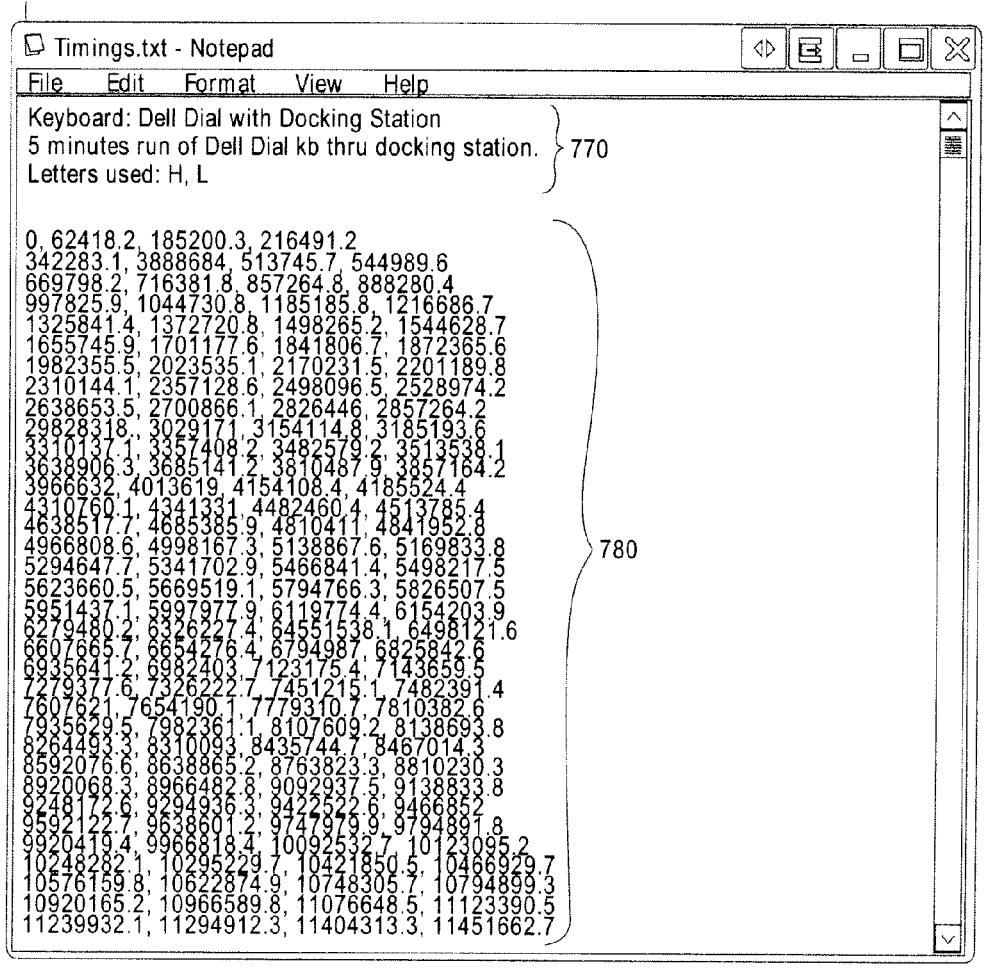
FIG. 7B is a diagram illustrating an output of measured timings from a keyboard.

FIG. 7A is a diagram illustrating a graphical user interface of a component for measuring timings from a keyboard. In one embodiment, a graphical user interface 701 of a timing capture software application may perform the data analysis. A description of the type of keyboard may be inputted into text field 710. Incrementing/decrementing arrows 720 may be used to set the number of keys per row that are tested.

The timing capture software application may capture the timing measurements from the apparatus as described above. A benefit of capturing the timing measurements includes identifying (e.g., calculating and/or isolating) the timing delays and differences in the delays between when a key is pressed (and/or released) and when resulting keystroke data is collected, that are particular to the tested keyboard.

Thus, two or more keys of a keyboard may be pressed (and/or released) by the device at measured or known times; and resulting keystroke timing data may be collected to identify delays and differences in delays between when the key is pressed (and/or released) and when the resulting timing data is collected. The differences in timing delays are detected by the apparatus to generate data used for producing biometric templates and authentication inputs. More particularly, this data can be subsequently used to generate calibration data for a type of keyboard (or combination of a type of keyboard and a type of computer) used for producing biometric templates and authentication inputs. Thus, the timing delays and differences in delays may be used to generate data used for producing biometric templates and authentication inputs, such as using the type of keyboard (and optionally using the type of computer) measured.

For example, such data may determine (e.g., identify) different delays for keystrokes and/or for types of timing noted above, for the same keys (e.g., "q", "l", or "k", etc.) of different types of keyboards or keyboard/computer pairs. Using (incorporating or based on) such data, more accurate biometric templates and authentication inputs can be produced, such as by subtracting out (e.g., removing through calculations) such differences in delays from the templates and/or authentication inputs. Thus if one type of keyboard has a longer delay than another type, the difference between those delays may be subtracted from the keystroke timing inputs of the keyboard with longer delay to provide a "normalized" or "calibrated" input between both keyboards for that key, such that the delay due to the type of keyboard will be the same for both the keyboards (e.g., results in fewer false identification authentications and rejections).

Moreover, such data may determine (e.g., identify) differences in delays for keystrokes and/or for types of timing noted above, for the same keys (e.g., "q", "l", or "k", etc.) of any one single type of keyboard or keyboard/computer pair. Using (incorporating or based on) such data, more accurate biometric templates and authentication inputs can be produced, such as by adjusting the tolerance of such delays to allow for or compensate for the differences in the templates and/or authentication inputs. Thus, if one key has a wide range of possible delay times for one type of keyboard, a wider threshold may be used when calculating keystroke timing inputs of that key to provide a "normalized" or "calibrated" input between different keys for that keyboard, such that the different delays due to that key will be not cause the templates and/or authentication inputs to result in excessively small or large tolerances (e.g., results in fewer false identification authentications and rejections).

In some cases, the differences between delays (e.g., accuracy, such as based on the range of the standard deviation of inconsistencies or differences in delays) in the detected types of timings can be so large that a type of keyboard will not be usable for bio-authentication template and/or authentication input. For instance, the press, release, dwell time, and flight time of a single key (or more keys) during a test run are measured and calculated to be greater than a predetermined threshold. Thus, the delays of one or more keys of this type of keyboard vary by so much, they will cause an unacceptable percentage (e.g., another predetermined threshold) of false identification authentications and/or rejections (e.g., even if corrected for).

In this manner, these characteristics may be identified and incorporated in a biometric template to improve the accuracy of a positive identification based on keyboard timing measurements. For example, a BLUETOOH keyboard may have particular delays that are not found in the control keyboard. Further, a keyboard on a laptop computer running on low battery power could have different timing measurements than when running on full battery power. The timing measurements enable the identification of the particular delays that are intrinsic to the keyboard device being tested; and correction or incorporation of that data to create more accurate, normalized and/or calibrated templates and authentication inputs.

Unless specifically stated otherwise as apparent from the preceding discussion, it is appreciated that throughout the description, discussions utilizing terms such as "processing" or "computing" or "calculating" or "determining" or "displaying" or the like, may refer to the action and processes of a computer system or similar electronic computing device, that manipulates and transforms data represented as physical (electronic) quantities within the computer system's registers and memories into other data similarly represented as physical quantities within the computer system memories (e.g., including non-volatile memory) or registers or other such information storage, transmission or display devices.

The present invention also relates to apparatus (e.g., a computer) for performing the data collecting, analyzing and storing operations (e.g., processes) herein, such as from/for apparatus 100 and a type of keyboard. This apparatus may include circuitry specially constructed for the required purposes, and/or it may comprise a special (or general) purpose computer selectively activated or specially configured by a computer program stored in the computer. Such a computer program (e.g., program instructions) may be stored in a computer readable (e.g., non-volatile) storage medium, such as, but not limited to, any type of disk including floppy disks, optical disks, compact disc read-only memory ("CD-ROM"), and magnetic-optical disks, read-only memories ("ROMs"), erasable programmable read-only memories ("EPROMs"), electrically-erasable read-only memories ("EEPROMs"), flash memories, magnetic or optical cards, or any type of media suitable for storing electronic instructions. Such a computer may also include a processor coupled to the storage medium to execute the stored instructions. The processor may also be coupled to a volatile memory (e.g., RAM) into which the instructions are loaded from the storage memory (e.g., non-volatile memory) during execution by the processor. The processor and memory(s) may be coupled to detector 145 and/or 147; as well as other circuitry of apparatus 100, as necessary, such as to perform one or more of the processes noted above for FIGS. 5-7B. Use of and/or operations performed by device 100 (and optionally the computer collecting data from that device and a keyboard), may be described as a machine implemented means or method.

In some cases, the operations of the computer described herein (such as to perform one or more of the processes noted above for FIGS. 5-7B) may be embodied in a machine-readable medium (e.g., non-volatile memory) having stored thereon data and instructions to cause a programmable processor to perform those operations. In other embodiments, the operations might be performed by specific hardware components of a specialized computer, that contains specialized hardwired logic. Those operations might alternatively be performed by any combination of programmed computer components and custom hardware components.

The embodiments of the present invention have been described largely by reference to specific examples illustrated in the figures and described above. However, those of skill in the art will appreciate that alternatives and modifications of the embodiments of this invention will become apparent to those skilled in the art without departing from the scope of this invention. Such variations and implementations are understood to be captured according to the following claims.

What is claimed is:

1. An apparatus comprising:
a first machine implemented means comprising a first cam for depressing a first key of a keyboard;
a second machine implemented means comprising a second cam for depressing a second key of the keyboard;
a machine implemented means for measuring a rotational speed of the first and second cam, wherein the machine implemented means for measuring a rotational speed further comprises:
a first means comprising a first light meter, a first propeller and a first flashlight for measuring a rotation of an electric motor;
a means for gearing down the rotational speed of the electric motor to a slower speed for the axle;
a second means comprising a second light meter, a second propeller and a second flashlight for measuring the rotation speed of the axle; and
a computer implemented means for collecting a plurality of press and release timing measurement data from the first and second keys, in response to depressing the first and second keys.

2. The apparatus of claim 1, further comprising:
a means comprising an axle coupled to the first and second cams for rotating the first and second cams to depress the first and second keys.

3. The apparatus of claim 2, wherein the first machine implemented means further comprises a first shaft coupled between the first cam and the first key to press the first key; and wherein the second machine implemented means further comprises a second shaft coupled between the first cam and the first key to press the second key.

4. The apparatus of claim 3, further comprising:
an adjusting means to adjust a height of a base supporting the keyboard, the adjusting means coupled to the base.

5. The apparatus of claim 2, further comprising:
a first supporting means for supporting the axle and a first and second depression means for depressing the first and second keys of the keyboard.

6. The apparatus of claim 1, wherein the computer implemented means collects rotational speed data from the machine implemented means for measuring the rotational speed of the first and second cams.

7. The apparatus of claim 6, further comprising:
a computer implemented means for storing and displaying the rotational speed data and the plurality of press and release timing measurement data.

8. The apparatus of claim 1, further comprising means for powering the electric motor using a regulated power supply.

9. A method comprising:
(a) repeatedly pressing and releasing a pair of keys of a keyboard using a mechanical device comprising a pair of cams attached to a rotating axle;
(b) measuring a rotational speed of the axle;
(c) collecting a plurality of press and release timing measurement data for the pressed and released pair of keys;
(d) setting up the keyboard comprising:
measuring a testbed height from a table, to the testbed supporting the keyboard;
measuring a distance from a bottom of a first cam of the pair of cams to a bottom of a depressed first key of the pair of keys; and
measuring a distance from the axle to a top of a second key of the pair of keys.

10. The method of claim 9 further comprising:
setting up a control keyboard in the mechanical device;
performing (a), (b) and (c) for the control keyboard; and
performing (a), (b) and (c) for a plurality of target keyboards.

11. The method of claim 10 further comprising:
performing data analysis on the collected a plurality of press and release timing measurement data of the control keyboard and of the target keyboards.

12. A method comprising:
(a) repeatedly pressing and releasing a pair of keys of a keyboard using a mechanical device comprising a pair of cams attached to a rotating axle;
(b) measuring a rotational speed of the axle;
(c) collecting a plurality of press and release timing measurement data for the pressed and released pair of keys, further comprising performing (a), (b) and (c) for a plurality of keyboards, wherein performing further comprising:
positioning the plurality of keyboards to be equidistant from the axle;
setting a first key height of each of the plurality of keyboards to an equal value;
verifying a same key on each of the plurality of keyboards is to be a first key to be depressed; and
performing (a), (b) and (c) comprising performing an equal number of rotations of the rotating axle during (a).

13. An apparatus comprising:
a first cam to push a first shaft to depress a first key of a keyboard;
a second cam to push a second shaft to depress a second key of the keyboard;
a rotating axle attached to the first and second cams to rotate to the first and second cams;
a meter to measure a rotational speed of the axle;
gears coupling an electric motor to the axle, the gears to gearing down the rotational speed of the axle as compared to the motor; and wherein the meter comprises:
a first light meter, a first propeller and a first flashlight for measuring a rotation of the electric motor; and
a second light meter, a second propeller and a second flashlight for measuring the rotation speed of the axle.

14. The apparatus of claim 13, further comprising:
a computer coupled to the keyboard to collect a plurality of press and release timing measurement data from the first and second keys in response to the first and second shafts pressing the first and second keys.

15. The apparatus of claim 14, wherein the computer is coupled to the meter to detect the rotational speed of the axle, and analyzes the collected plurality of press and release timing measurement data.

16. The apparatus of claim 14, wherein the first shaft comprises a first pad coupled between a bottom end of the first shaft and the first key, and wherein the second shaft comprises a second pad coupled between a bottom end of the second shaft and the second key.

17. The apparatus of claim 15, further comprising:
an adjustable base supporting the keyboard and adjustable to adjust a distance between depressed keys of the keyboard and the first cam in the down position.

* * * * *